Nov. 12, 1963    P. D. BOLTON    3,110,048
RAMP FOR AIRPORT PASSENGERS AND FREIGHT
Filed May 18, 1960    6 Sheets-Sheet 1

INVENTOR.
PAUL D. BOLTON
BY Fulwider, Mattingley
& Huntley
ATTORNEYS

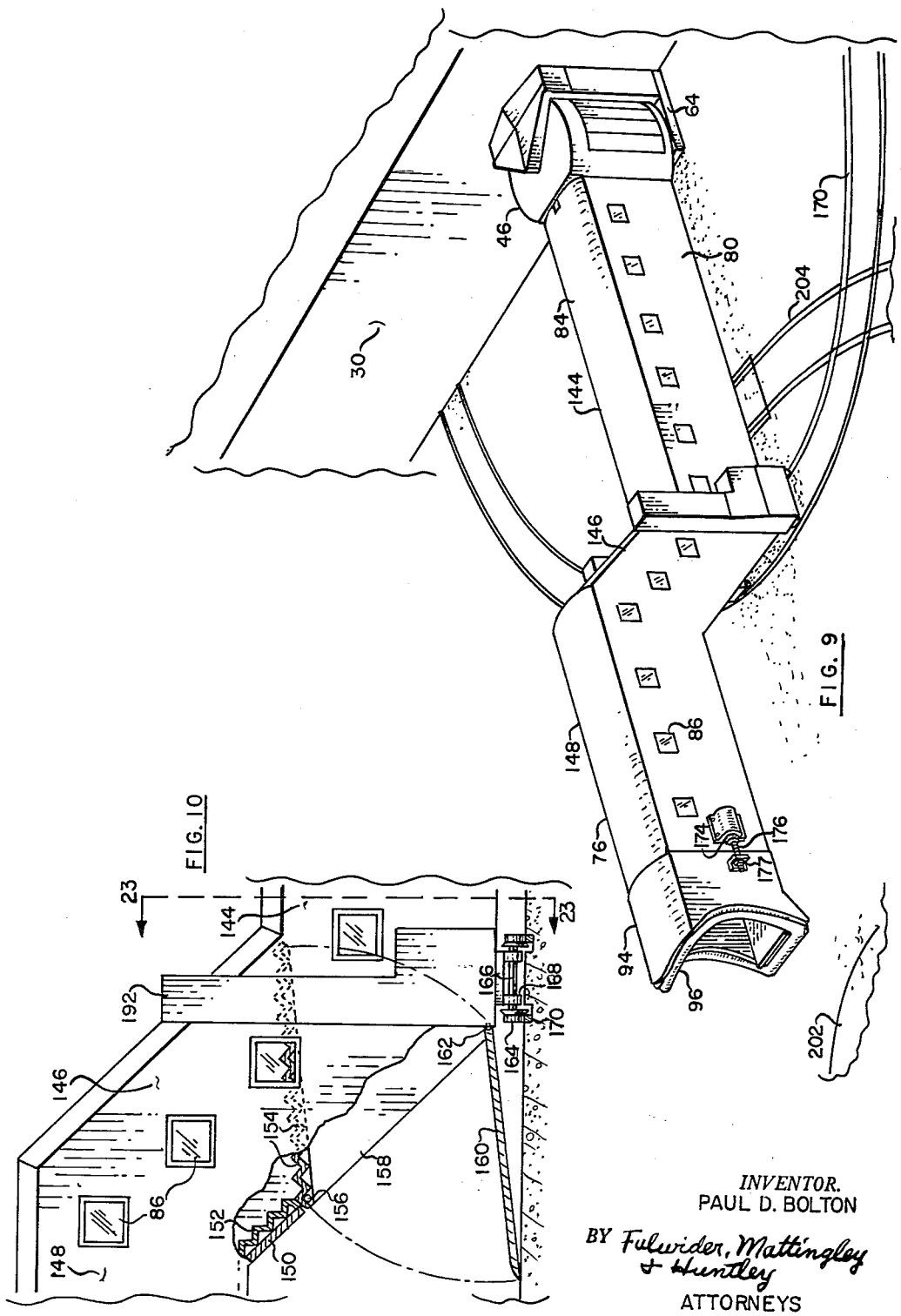

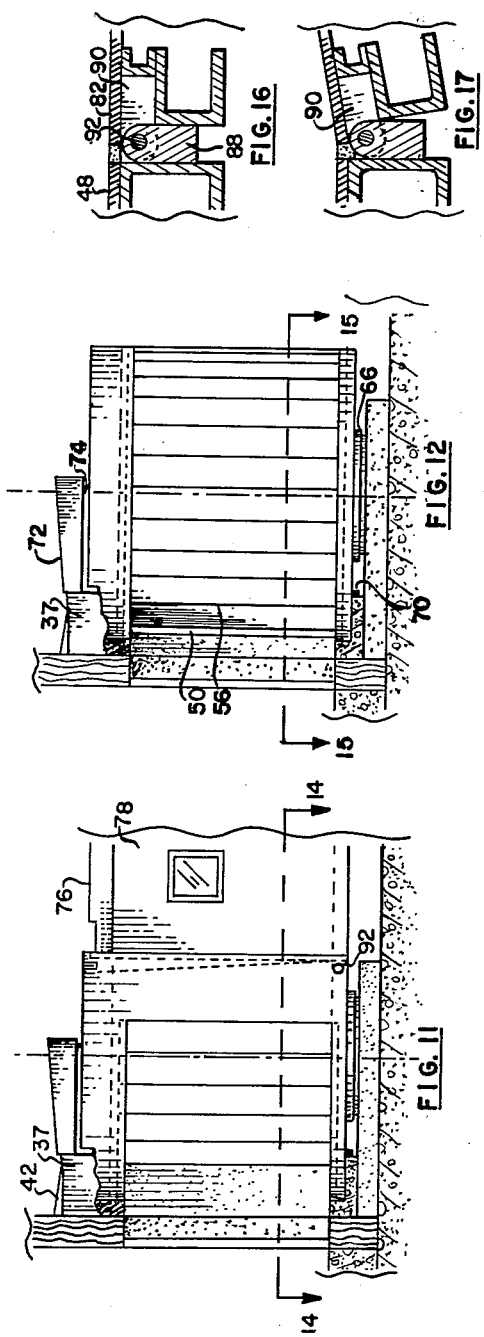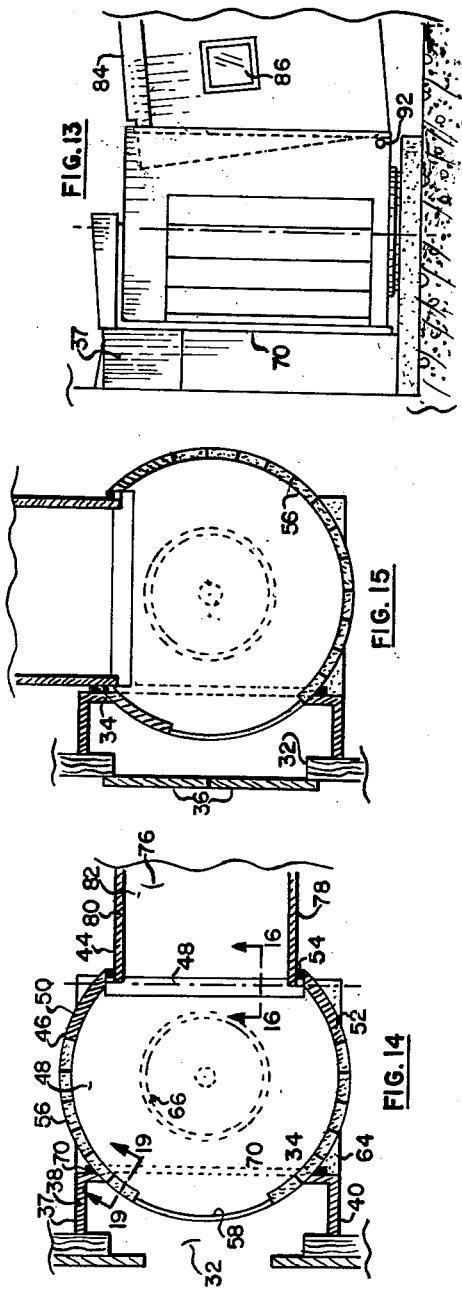

Nov. 12, 1963 P. D. BOLTON 3,110,048
RAMP FOR AIRPORT PASSENGERS AND FREIGHT
Filed May 18, 1960 6 Sheets-Sheet 4
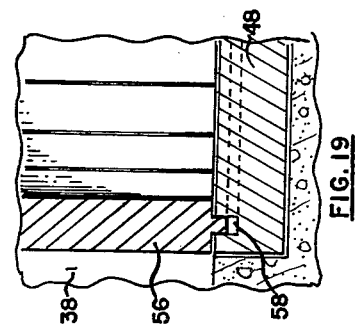
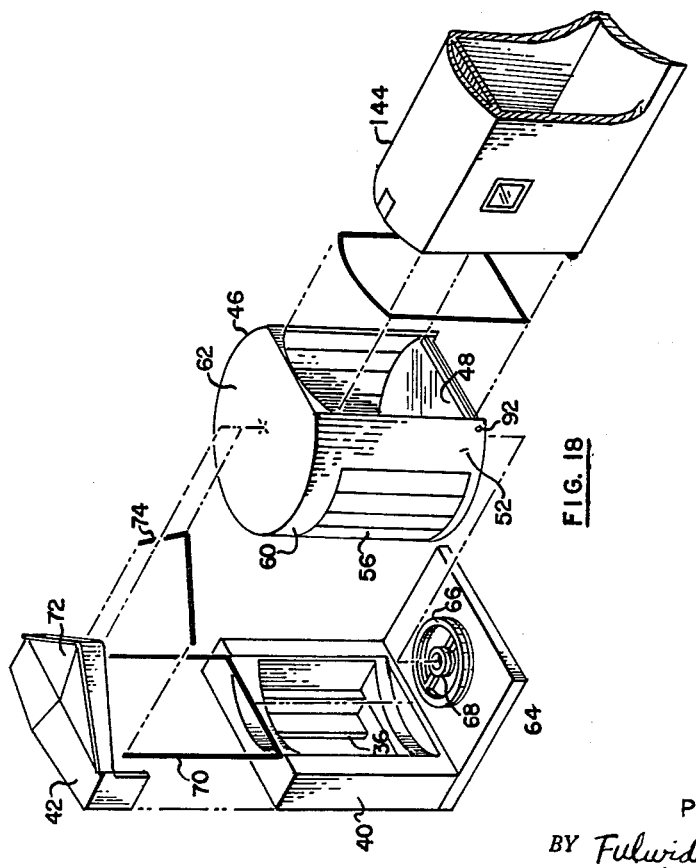
*INVENTOR.*
PAUL D. BOLTON
BY Fulwider, Mattingley
& Huntley
ATTORNEYS Nov. 12, 1963   P. D. BOLTON   3,110,048
RAMP FOR AIRPORT PASSENGERS AND FREIGHT
Filed May 18, 1960   6 Sheets-Sheet 5
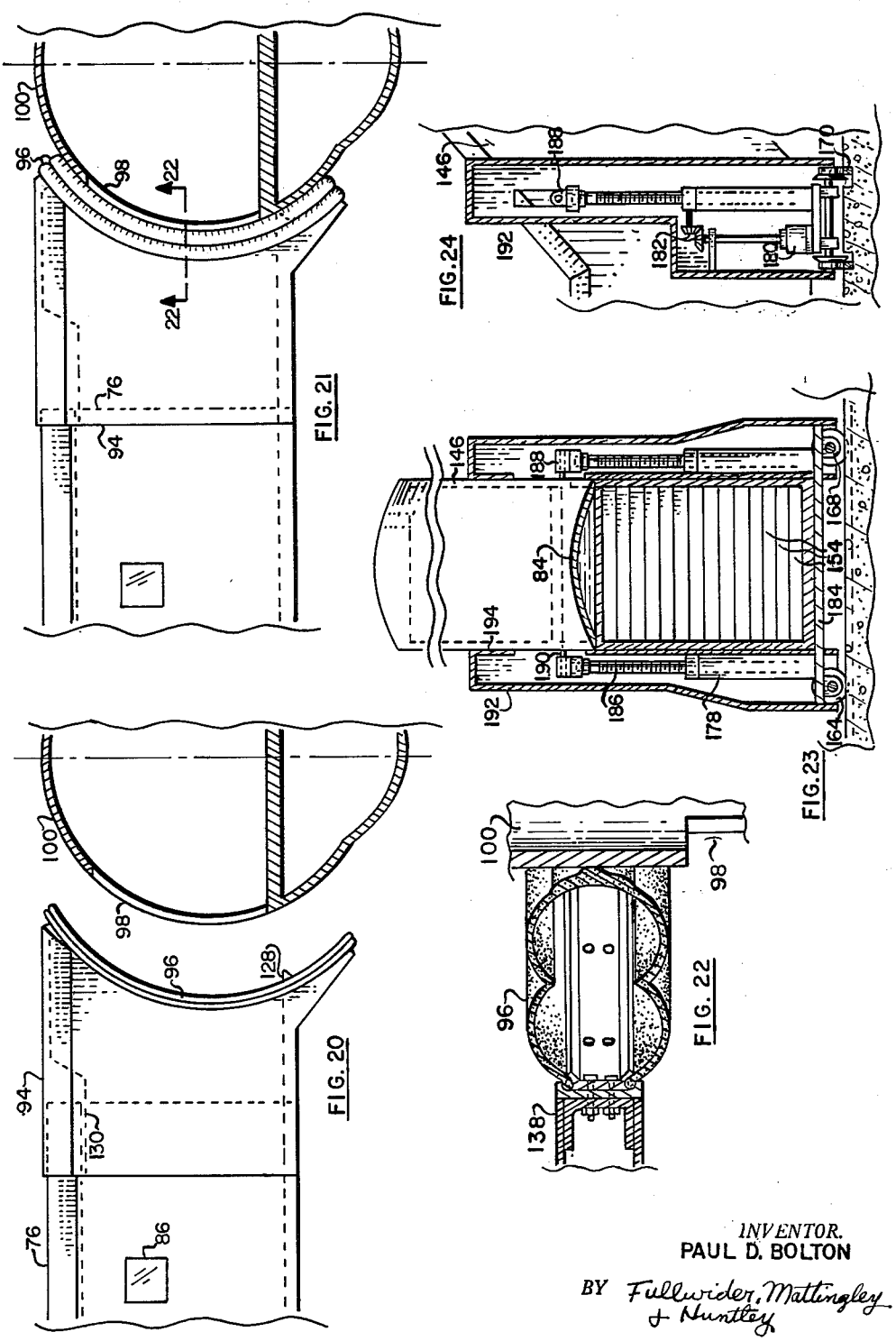
INVENTOR.
PAUL D. BOLTON
BY Fullwider, Mattingley
& Huntley
ATTORNEYS INVENTOR.
PAUL D. BOLTON
BY Fulwider, Mattingley & Huntley
ATTORNEYS 3,110,048
RAMP FOR AIRPORT PASSENGERS AND
FREIGHT
Paul D. Bolton, 9610 Shadydale Lane, Dallas, Tex.
Filed May 18, 1960, Ser. No. 29,940
3 Claims. (Cl. 14—71)

The present invention relates to ramps and more particularly to ramps for passengers or freight, which ramps lead to and from a terminal building, such as those at airports, and lead to and from an aircraft.

In the broad aspect of the present invention, one end of the ramp is hingedly or pivotally connected adjacent the door opening of a terminal building. This pivotal connection provides for swinging the ramp in substantially a horizontal plane so that the free end is brought into registering relationship with the passenger or freight entrance-exit opening of an aircraft.

In a more limited aspect of the invention, the ramp includes two sections, one of which is movable vertically with respect to the other, so that, in addition to providing for swinging the ramp in a substantially horizontal plane, it can be raised to register with any passenger or freight openings in various height aircraft.

Further refinements of the present invention include forming the swinging ramp of a main section and a section at the free end of the main section which telescopes longitudinally of and with the main section.

Specifically the floors of the ramp sections comprise longitudinally extending slats or slots, the slats of one section being spaced from one another for receiving likely spaced slats of the other section, so that the slats of one section can telescope longitudinally with the slats of the other section.

In carrying out the present invention, the hinged end, providing for horizontal swinging movement of the ramp, is in the form of an enclosure having a door opening which is adapted to register with the door opening in the terminal building, and having a door opening leading outwardly toward the free end of the ramp.

Preferably the door opening of the terminal building is arcuately shaped in horizontal cross-section and likewise, the wall section of the enclosure, between the door openings of the enclosure is arcuately shaped to complement the arc of the door opening in the terminal building, and too this wall is formed of a plurality of vertically extending panels which can be moved individually or in unison horizontally to uncover the door opening in the terminal building when the ramp is moved to a position alongside of the building.

Obviously the ramp floor can lie in a substantially horizontal plane, if for example the door opening in the terminal building is at substantially the same level as the door opening in the aircraft. Such door opening in the terminal building may be at the second floor if the floor level of the building is at substantially the same level as the runway. The horizontal hinge connection between sections of the ramp provides for aligning the ramp with the door openings of various height door openings of aircraft. In fact the ramp can be adjusted for gradual inclination from a ground level door opening of the terminal building to the higher door opening in the aircraft.

However, in the specific embodiment illustrated, the ramp includes two sections, one disposed at near ground level, the ramp including an intermediate section formed as a stairway. This stairway provides a bottom wall for an opening intermediate the two sections and when removed, a ground level passage is provided leading to and from the field or runway and the door of the terminal building. The stairway is pivotally connected to the upper of the two sections for opening and closing the said passage.

Bearing means, in the form of rollers or wheels, are disposed outwardly of the pivoted end of the ramp and bears the major part of the weight of the ramp. Preferably horizontally disposed arcuately shaped track is arranged to carry and guide the bearing means.

Further advantages will be apparent from the following description, reference being had to the accompanying drawings wherein a preferred embodiment of the invention is illustrated.

In the drawings:

FIG. 1 is a top plan view of the fragment of a terminal building, a turntable for an aircraft and an airplane shown in phantom; in this view the ramp is in a position parallel with a wall of the terminal building and the airplane is shown in the position in which it taxied in;

FIG. 9 is a fragmentary perspective view of the terminal building and a perspective view of the ramp and showing a fragment of the arcuate track for the front landing gear of the airplane and showing the arcuate track for guiding and supporting the ramp;

FIG. 10 is a fragmentary side view of a section of the ramp, shown in FIG. 9, a part thereof being broken away to show a door opening and showing part of the stairway in elevated position;

FIG. 11 is a fragmentary view of the terminal building at the entrance or exit thereof and showing the pivoted or hinged end of the ramp and showing the ramp moved toward loading or unloading position;

FIG. 12 is a view similar to FIG. 11 but showing the ramp in the position shown in FIG. 1;

FIG. 13 is a view similar to FIG. 11 but showing the free end of the ramp partly raised;

FIG. 14 is a fragmentary sectional view taken along line 14—14 of FIG. 11;

FIG. 15 is a fragmentary sectional view taken along line 15—15 of FIG. 12;

FIG. 16 is a fragmentary sectional view taken along line 16—16 of FIG. 14 but on a somewhat larger scale;

FIG. 17 is a view similar to FIG. 16 but showing the free end of the ramp partly raised;

FIG. 18 is an exploded perspective view of the pivoted end of the ramp;

FIG. 19 is a sectional view taken on line 19—19 of FIG. 14;

FIG. 20 is a fragmentary view of the free end of the ramp and a fragmentary cross-sectional view of the fuselage of an aircraft with the free end of the ramp spaced from the fuselage;

FIG. 21 is a view similar to FIG. 20 but showing the free end of the ramp in loading and unloading position with respect to the fuselage;

FIG. 22 is a fragmentary sectional view taken along line 22—22 of FIG. 21 but on a somewhat larger scale;

FIG. 23 is a sectional view taken substantially along line 23—23 of FIG. 10;

FIG. 24 is a fragmentary side view of the mechanism shown in FIG. 23;

Figure 4:
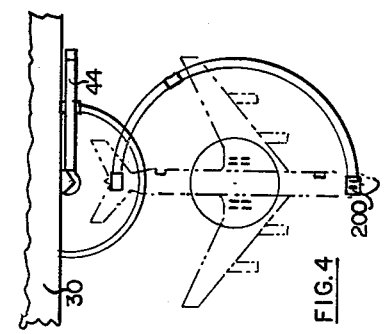
FIG. 4 is a view similar to FIG. 1 but showing the airplane turned to a position in which it will be removed from the turntable.
Figure 8:
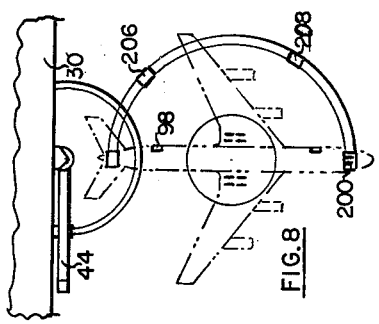
FIG. 8 is a view similar to FIG. 4 but showing the ramp moved 180 degrees from that shown in FIG. 4.
Figure 3:
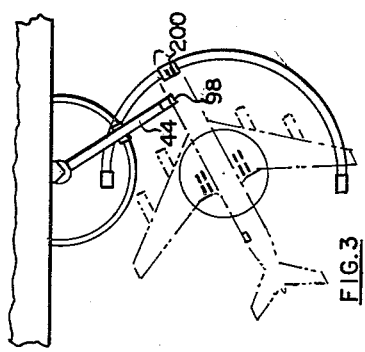
FIG. 3 is a view similar to FIG. 2 but showing the airplane retracted to its loading or unloading position.

Referring more in detail to the drawings, the terminal building is shown at 30 and, as is more clearly shown in FIGS. 11 to 13 inclusive, is provided with two door openings 32 and 34. The door opening 32 may be closed by hinged or sliding doors 36. The door opening 32 is spaced from the door opening 34 by a framework 37 including side walls 38 and 40 and the top wall or cover 42.

The ramp is generally indicated at 44 and includes a rotatable or turntable portion 46 which is arcuate in horizontal cross-section. The rotatable portion 46 includes a circularly shaped floor 48 which carries stationary panels 50 and 52. These panels are spaced from one another to provide a door opening 54. The rotatable portion 46 also includes a plurality of upright panels 56 and these panels are carried by an arcuately shaped track 58 in the floor 48. This track is more clearly shown in FIG. 19. The panels 50 and 52 carry an upper band 60 which in turn carries the roof 62. The under side of the arcuately shaped band 60 is also provided with a track similar to track 58. The panels 56 being movable, they can be shifted from the position shown in FIGS. 11 and 14 to the position shown in FIGS. 12 and 15. The floor of the terminal where it meets with the floor 48 of the ramp portion 46 is arcuate (see FIGS. 14, 15, 18 and 19) in complementary relationship with the floor 48.

A concrete base 64 extends outwardly of the terminal frame 37 and this base carries a circular track or bearing 66 and a concentrically arranged bearing 68. The bearing 68 receives a trunnion (not shown) extending concentrically of the floor 48 of the rotatable portion 46 of the ramp and the bottom part of this floor may also carry rollers which ride upon the track 66. Thus it will be seen that the rotatable portion 46 of the ramp can be swung or oscillated about a vertical axis. As will be seen more clearly from FIGS. 14 and 15, the rotatable portion 46 of the ramp extends partly within the frame 37. Suitable gaskets or sealing strips 70 provide weather stripping between the rotatable portion 46 and the frame 37. A roof 72 extends partly over the rotatable portion 46 and there is provided a sealing strip 74 between the roof 62 of the terminal building and the roof 72 of the rotatable portion 46.

The ramp 44 includes an outwardly extending section 76 having opposite side walls 78 and 80, a floor 82 and a roof 84. The side walls are provided with a plurality of glass windows 86. The floor 82 of the section 76 is a continuation of the floor 48 of the rotatable portion 46 and lies flush with the floor 48 when the section 76 is in its lowermost position, as is more clearly shown in FIG. 16. The outer end of the floor 48 carries a bearing 88 and the adjacent end of the floor 82 carries a bearing 90. These bearings include aligned portions which receive a pivot pin 92. The bearings 88, 90 and the pin 92 provide a piano type hinge. The pin 92 extends horizontally whereby the ramp section 76 is mounted for vertical movement thereabout whereby the extreme free end of the ramp may be raised and lowered so as to register with a door opening of an aircraft. By properly positioning the aircraft with respect to the vertical center of the ramp 44, the ramp can be adjusted horizontally and vertically so as to register with the door opening of the aircraft.

Inasmuch as time can be saved in positioning the aircraft with respect to the ramp by providing for longitudinal adjustment of the length of the ramp, the free end of the ramp section 76 carries a telescoping section 94, and the extreme outer end of the section 94 is provided with an inflated contacting element 96 which is preferably of the bellows type, as is more clearly shown in FIG. 22. Thus should the extreme end of the section 94 be somewhat out of line with the opening 98 in the fuselage 100 of the airplane, the inflated element 96 flexes to seal the entire opening 98. This inflated element 96 may be formed of rubber or any suitable equivalent material.

Figure 25:
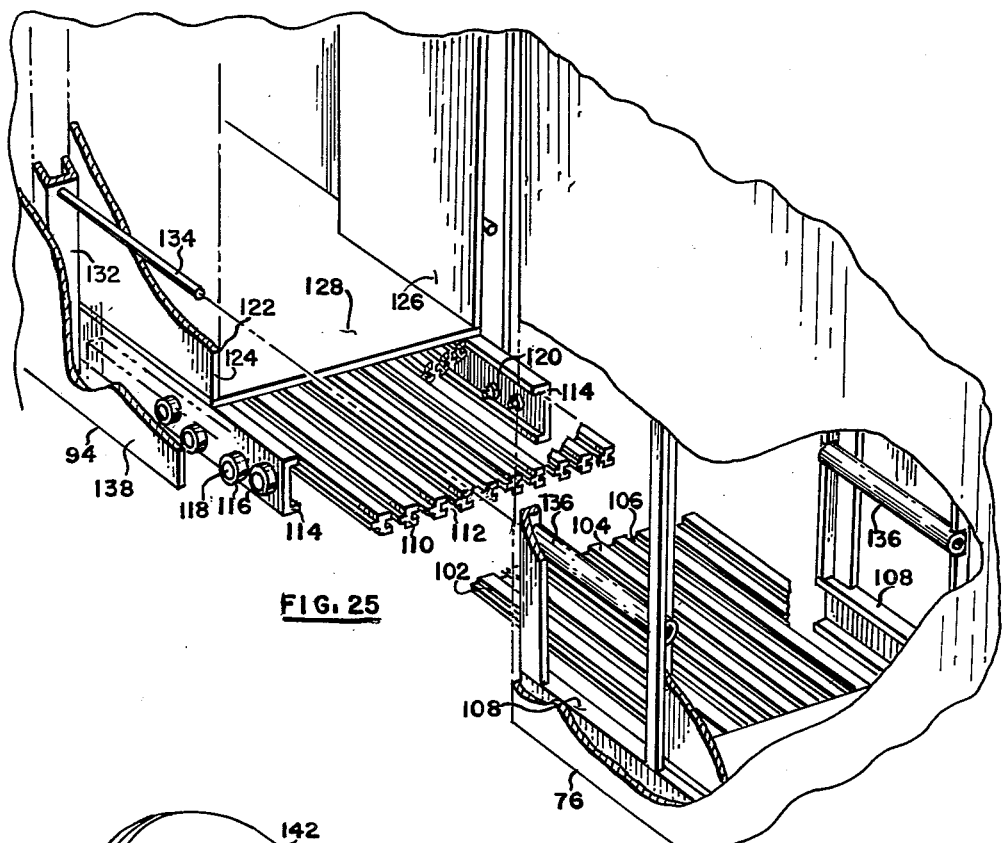
FIG. 25 is a perspective view of the telescoping portions of the ramp but showing said parts as separated from one another, part of the housing being broken away for the sake of showing the detailed mechanism therein.
Figure 26:
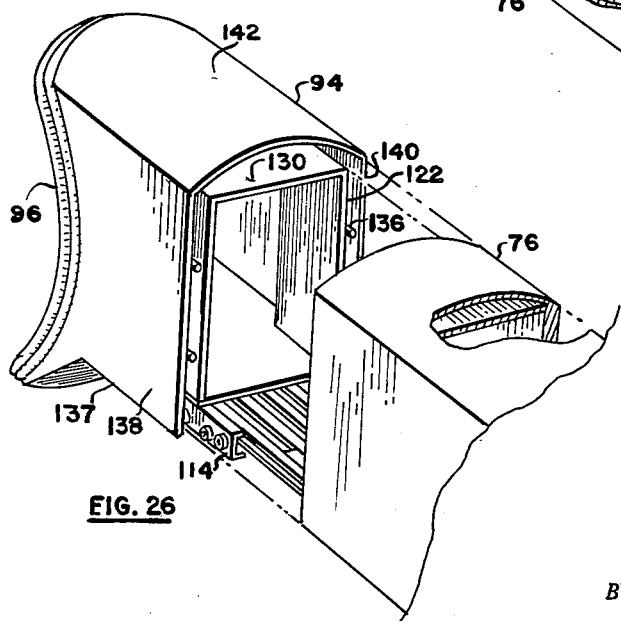
FIG. 26 is a fragmentary view similar to FIG. 25 but showing the parts in elevation.

Referring more in detail to the connection between the sections 76 and 94, attention is specifically directed to FIGS. 25 and 26. It will be seen that the floor 102 of the section 76 is provided with longitudially extending slat-like sections 104 which are spaced from one another as at 106, and the section 76 also includes longitudinally extending channel irons 108 having their open sides confronting one another. Likewise the section 94 includes longitudinally extending slat-like sections 110 which telescope with the slats 104, there being spaces 112 between the slats 110 which receive the slats 104 and the spaces 106 receive the slats 110. The section 104 includes longitudinally extending channel irons 114 which carry rollers 116. These rollers are carried by bearings 118 held in place by nuts 120. These rollers 116 are received by the channels 108 whereby the section 94 can be moved to and fro with respect to the section 76.

The section 94 includes the inner housing 122 including side walls 124 and 126, a floor 128 and a roof 130. The framework of section 94, including the channel irons 114, carries uprights 132 on opposite sides of the housing 122. These uprights in turn carry horizontally extending rods or shafts 134 which are received by tubes 136 carried by the section 76 and thus these rods and tubes assist in guiding the section 94 on section 76. The housing 122 and the framework of the section 94 is covered by a housing 137 including side walls 138 and 140 and a top wall 142. The extreme outer end of the housing 137 carries the inflated element 96.

The section 94 can be extended several feet with respect to the section 76 so as to readily accommodate aircraft of various sizes, and also the precision of placement of the airplane with respect to the ramp is minimized.

Inasmuch as the major portions of the ramp may be raised vertically, such major portions can be slanted upwardly sufficiently to provide a gradual incline from the stationary portion 46 to the door opening 98 of the aircraft. Under the circumstances, however, it is desirable to, instead of providing a slanted ramp, provide one having a stairway, and such aspect of the invention is shown in FIGS. 9, 10, 23 and 24. Here the section 76 is divided into sub-sections 144, 146 and 148. In this aspect of the invention one end of the sub-section 144 is hingedly connected by hinge 92 to the rotatable section 46 and the opposite end is rigidly connected to the lower portion of sub-section 146. This sub-section 146 slants upwardly and the upper end thereof is rigidly connected to one end of sub-section 148 and the opposite end of the sub-section 148 is in telescoping relationship with the section 94. These sub-sections 144, 146, and 148 are provided with floors, side walls and roofs as was explained with respect to section 76. The floor of the sub-section 146 comprises a slanting wall 150 which carries a series of steps 152 and the floor also includes a series of steps 154 which are hinged by hinge pin 156 to the slanting wall 150 at the top thereof. When the series of stairs 154 are raised about the pivot 156 an opening 158 is formed in the lower part of sub-section 146 by which access may be had to the interior of sub-section 144. If desired a ramp 160 can be readily attached by pivot pin 162 to the side walls of the sub-section 146. This ramp may be swung upwardly and parallelly with the wall 150 when the series of stairs 154 are in the lowered position.

Thus it will be seen that the passage can include the sub-section 144, sub-section 146 including the series of stairs 154 and 152, and sub-section 148, or the terminal may be entered through the opening 158 in sub-section 146 and through the sub-section 144.

To facilitate movement of the ramp 44 or the ramp sub-sections 144, 146 and 148, these elements may be carried by suitable bearings herein shown as wheels or rollers 164 on axles 166, and these axles are carried by suitable bearings 168 on the under side of the ramp. In the preferred embodiment the rollers 164 ride upon a pair of tracks 170. These tracks are arranged arcuately about the vertical center of the portion 46 of the ramp.

In the embodiment shown the bearings 168 for the rollers 164 are carried by the extreme outer end of subsection 144. The ramp may be oscillated either manually or by any suitable hydraulic or electrical equipment.

Likewise the section 94 may be shifted longitudinally with respect to section 76 or sub-section 148 by any suitable shifting mechanism, and for that purpose there is herein shown an electric motor which, through gearing contained in housing 174 actuates a screw 176, which in turn is threaded into a stationary nut 177. Here the motor shown is carried by the sub-section 148 and the nut by the section 94. Preferably two of these driving mechanisms are provided, one on either side of the section 94 and sub-section 148.

Any suitable mechanism may be employed for raising the free end of the ramp about the pivot pin 92. Such mechanism as herein shown has a pair of mechanical jacks of the screw type 178 which are operated by an electric motor 180 through gearing 182. This jack is herein shown as being carried by a dolly 184, and this dolly in turn carries the bearings 168 for the rollers 170. The top of the screws 186 of the jacks 178 carry bearings 188 which in turn carry pins 190 which are fastened to the ramp, and as herein shown pins 190 are connected to the ramp sub-section 146. It will be seen that as the screws 186 are raised and lowered the ramp will be raised and lowered about the pins 190.

Frames 192 are fastened to the dolly 184 and are provided with downwardly extending portions 194 for guiding the ramp as it is being raised or lowered.

Referring now to FIGS. 1 to 8 inclusive, in the operation of the device the airplane shown at 196 includes the main landing gear 198 and the nose landing gear 200. For loading or unloading the airplane, the airplane 196 is moved into the position shown in FIG. 1, that is, with the main landing gear 198 on a turntable 202 and the nose gear onto a dolly (not shown) which dolly rides upon a track 204. This turntable, dolly and track are more clearly shown in my co-pending application Serial No. 692,910 and now Patent No. 3,040,676, issued June 26, 1962 filed October 28, 1957, entitled "Aircraft Positioning and Locating System," or in my application Serial No. 29,432 and now Patent No. 3,035,528, issued May 22, 1962, filed May 16, 1960, for "Electric Weighing Apparatus." The airplane can be taxied under its own power to the position shown in FIG. 1 or moved there in any other suitable manner, as by a tractor. This airplane positioning and locating device is provided with a station at which the airplane can be weighed. Such station is indicated by the numeral 206. After the airplane has been moved under its own power for example, to the position shown in FIG. 1, it is rotated to the position shown in FIG. 2 whereby the ramp 44 can be moved from the position shown in FIG. 1 to the position shown in FIG. 2 without contacting the airplane. The airplane is then retracted to the position shown in FIG. 3 in which the ramp and airplane are in loading or unloading position and also in weighing position. After the airplane is loaded it can be moved to the position shown in FIG. 4 and then moved to its starting position on the field, which starting position preferably is remote from the terminal and preferably the airplane is moved by auxiliary means, i.e., means other than its own power to this starting position.

The illustrations in FIGS. 1 to 4 are in connection with an airplane of the type in which the loading and unloading is through an opening in the front portion of the airplane.

Figure 7:
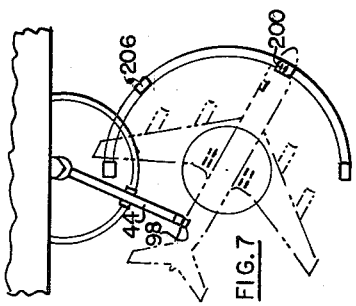
FIG. 7 is a view similar to FIG. 6 but showing the ramp and airplane in loading and unloading position.
Figure 2:
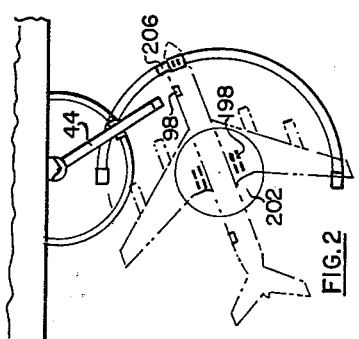
FIG. 2 is a view similar to FIG. 1 but showing the airplane turned to a position at which the ramp can be moved to loading and unloading position and showing the ramp in said position.
Figure 6:
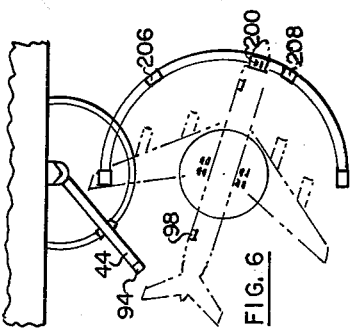
FIG. 6 shows the position of the airplane as the ramp is being moved to the loading and unloading position.
Figure 5:
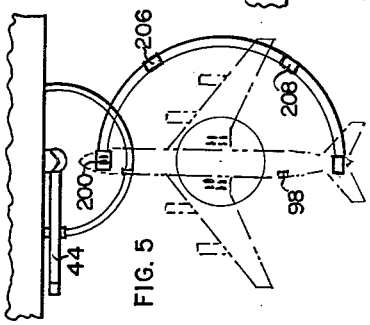
FIG. 5 is a view similar to FIG. 1 but showing the ramp moved 180 degrees from that shown in FIG. 1, preparatory to loading or unloading from the rear of the airplane.

When it is desirable to load the rear portion of the airplane, it is first moved from the position shown in FIG. 5 to the position shown in FIG. 6, and after it is moved to this position as shown in FIG. 6 the ram 44 is moved into loading position as shown in FIG. 7 and the airplane is then retracted in a clockwise direction so that the door opening 98 registers with the extreme open end of the ramp section 94. There may be another weighing station 208 at the loading position as shown in FIG. 7. After the loading is completed the airplane is moved to the position shown in FIG. 8 and thereafter removed by auxiliary means to the starting position in the field.

Among the many advantages of the present invention, attention is specifically directed to the ease of positioning the ramp into and away from the loading and unloading position with respect to the aircraft. It is necessary to only position the aircraft in an approximate place, then the ramp is readily swung into position, there being a track for the ramp carrying bearing means whereby the ramp is swung easily and readily. Then the telescoping end section is extended longitudinally, and with the cooperation of the inflated sealing element, a weatherproof ramp passage is provided between the terminal building door and the interior of the aircraft.

Figure 1:
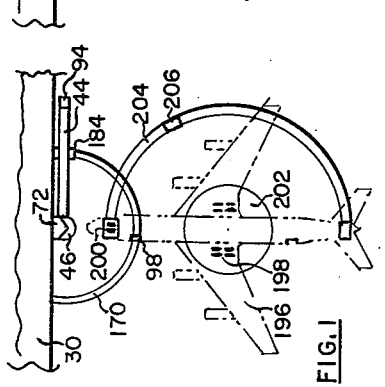

Likewise the ramp is readily removed from its registering position with the door opening of the aircraft to a position in parallel relation with the wall of the terminal building, as shown in FIGS. 1 and 5.

It will be observed from FIG. 15 that the door openings 32 and 34 of the terminal building are not blocked by the ramp although the ramp is in a position lying parallelly of the terminal building, i.e., the ramp is not registering with the door opening in the aircraft. This is made possible by providing for horizontal sliding movement of the side walls of the rotatable portion of section 46 of the ramp. It will be seen that as the ramp is swung from its registering position with the door opening of the aircraft, as shown in FIG. 14, to its position shown in FIG. 15, the panels 56 will block the opening 34. However, these panels 56 can be shifted in either horizontal direction, i.e., to the right or left, and, as illustrated, such panels had been shifted to the right, i.e., counterclockwise as viewed in FIGS. 14 and 15, whereby, as shown in FIG. 15, a door opening is provided between stationary panel 50 and the panels 56.

Therefore, when the stairs are raised, a passageway is provided between the field and the terminal building through the opening 158 of ramp section 76 or 144, and through either of said sections and the door openings 34 and 32.

Inasmuch as the free end of the ramp can be adjusted vertically, it can be adjusted to register with various heights of doors and various types of aircraft.

The present invention is particularly useful in connection with the aircraft positioning mechanism shown and described in the aforementioned applications.

While the form of embodiment herein shown and described constitutes a preferred form, it is to be understood that other forms may be adopted falling within the scope of the claims that follow.

I claim:

1. In combination with a terminal building for an airport or the like having a door opening, the floor of said building having an arcuate shape at said door opening; a ramp including a turntable; said turntable having an arcuately shaped floor adjacent to, aligned with, and complementing the arcuate shape of the floor of the building; said turntable being in the form of an enclosure having a door opening alignable with the door opening of the terminal building, and having a second door opening leading outwardly toward the free end of the ramp, the enclosure including vertically extending walls between the door openings of the enclosure, said vertically extending walls being arcuately shaped in horizontal cross-section and comprising a plurality of vertically extending panels slidably mounted for horizontal movement such that the location of the first mentioned door opening of the enclosure may be varied; and means for pivotally supporting the turntable for arcuate horizontal movement about the door opening.

2. In combination with a terminal building for an airport or the like having a door opening, the floor of said building having an arcuate shape at said door opening; a ramp including a turntable, said turntable having an arcuately shaped floor adjacent to, aligned with, and complementing the arcuate shape of the floor of the building; means for pivotally supporting the turntable for arcuate horizontal movement about the door opening; said ramp includes two sections, said sections being on different substantially horizontal planes; and a stair connecting said sections, and in which the stair provides a wall between said sections; a hinge; said stair being hingedly connected with the upper section by said hinge, providing an opening between said sections when the stair is moved upwardly about the hinge.

3. A combination as defined in claim 2, including bearing means supporting the lower of said ramp sections adjacent the outer end thereof.

References Cited in the file of this patent
UNITED STATES PATENTS

| | | |
|---|---|---|
| 172,830 | Stewart | Feb. 1, 1876 |
| 655,566 | Moore | Aug. 7, 1900 |
| 2,478,177 | Beutel et al. | Aug. 9, 1949 |
| 2,581,293 | Read et al. | Jan. 1, 1952 |
| 2,688,761 | Good et al. | Sept. 14, 1954 |
| 2,700,169 | Henion | Jan. 25, 1955 |
| 2,852,176 | Harmon | Sept. 16, 1958 |
| 3,038,185 | Moore | June 12, 1962 |

FOREIGN PATENTS

| | | |
|---|---|---|
| 259,235 | Italy | June 19, 1928 |